C. DION.
Fire Alarm.
No. 2,409. Reissued Dec. 4, 1866.
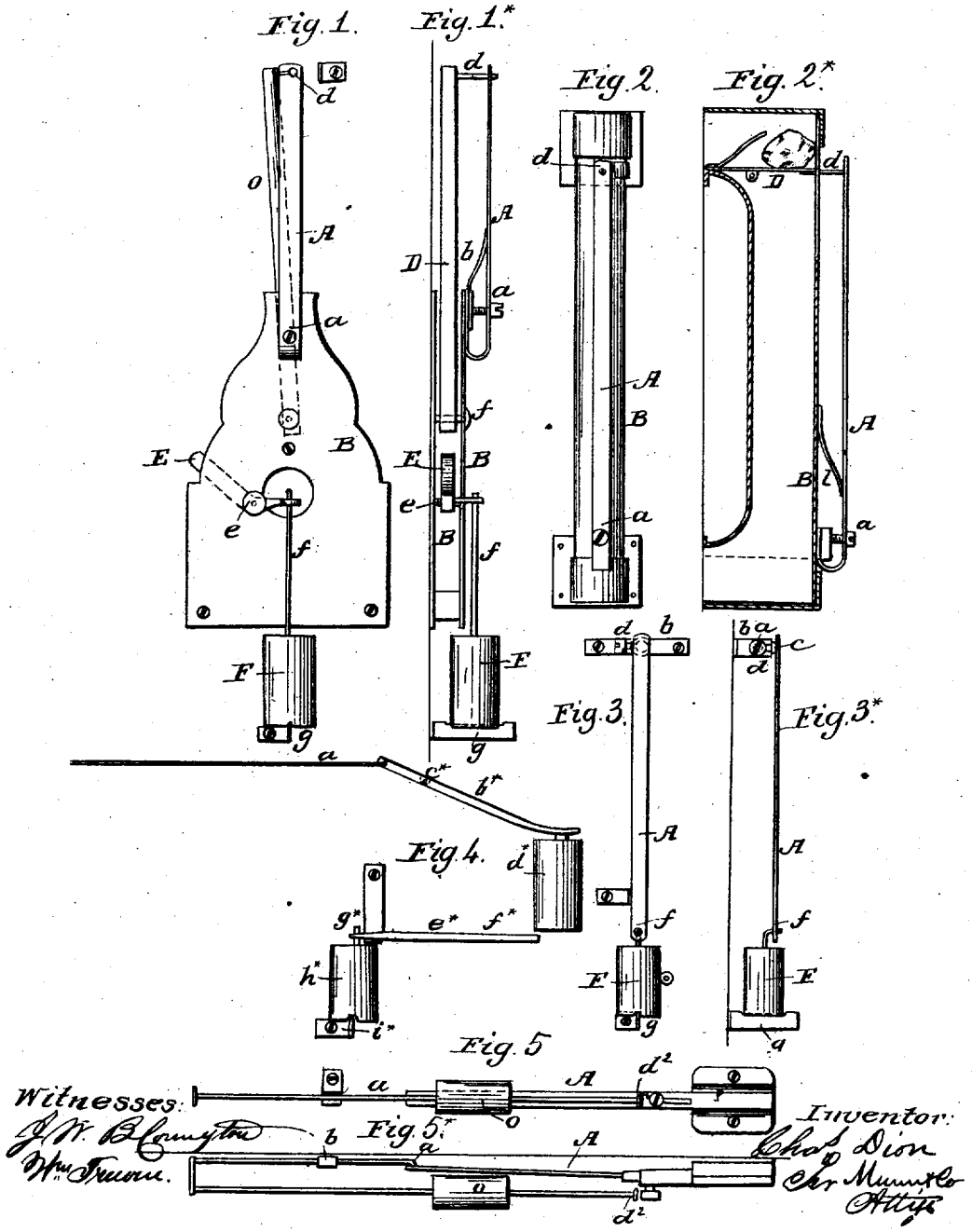
N. PETERS, Photo-Lithographer, Washington, D. C.

United States Patent Office.

IMPROVED FIRE ALARM.

CHARLES DION, OF MONTREAL, CANADA.

*Letters Patent No.* 53,757, *dated April* 3, 1866; *reissue No.* 2,409, *dated December* 4, 1866.

SPECIFICATION.

TO ALL WHOM IT MAY CONCERN:

Be it known that I, CHARLES DION, of the city of Montreal, Province of Canada, photographic artist, have invented certain improvements in Dion's Domestic Fire Alarm; and I do hereby declare that the following is a full and exact description thereof, reference being had to the accompanying drawing, in which the various modifications of the same are illustrated.

The leading improvement, which may be used in five different modifications, to be described, consists in the substitution of a straight spring or expansion piece in place of the spiral or helical spring used in the original invention, as described in Letters Patent granted to me August 25th, 1865, and of the same combination and construction, with the simplification of the entire apparatus by doing away with all the complicated mechanism used in the former apparatus, thereby rendering its action more prompt, less liable to get out of order, and at the same time the cost of construction is reduced, being based on the principle of expansion of metals, either arranged together as in modifications Nos. 1, 2, 3, and 5, or singly, as in No. 4.

No. 1 is the first modification to be described, and this modification is shown in Figures 1 and 2. In this case a spring, A, is used as the expansion piece, and this spring is attached at its lower end to a metal or other plate B, and regulated by a screw, *a*, and secondary spring, *b*, which is attached to the plate, B, at one end, and acts with its other end against the first spring. Near the upper end of said spring is a small hole for the reception of a short pin, *d*, attached to the upper end of a falling lever, D, or this pin may be attached to the spring A, and work in a small hole in the falling lever, as may be desired. On this pin a graduated scale may be placed to indicate the temperature at which the alarm may be set, if so required, or this scale may be attached to the board holding the arm in immediate proximity with the spring, and perform a similar service. The falling lever referred to may be supported at its lower end on a pivot, *c*, on which it will loosely revolve, or it may be placed on a knife-edge. When the spring expands from the heat, the pin, *d*, releases the lever, D, and in falling this lever strikes a crooked lever, E, which works on a pivot, *e*. One end of said crooked lever is perforated with a hole for the reception of the end of a rod, *f*, attached to the falling weight, F, which is supported on a knife-edge, *g*, as shown in the drawings. This falling weight may be attached by a wire chain or cord to the crank movement of a bell wire, and thus gives the alarm, to be more particularly described hereafter.

No. 2 is the second modification, represented in Figures 2 and 2* of the drawing. It consists of a spring, A, similar to that described for No. 1, and provided with the same mode of arrangement by means of a regulating screw, *a*, and spring, *b*, at the lower end. The spring is secured at the lower end of a tube, B, which is placed on the side wall of the room. At the upper end of the spring is a small hole for the reception of the end of a small pin, *d*, which is connected to a tilting platform, D, on the inner side of the tube. This tilting platform supports a marble or other weight, and when the spring expands by the heat it releases the pin, *d*, and allows the platform to tilt so that the marble falls through the tube, and gives the alarm by means of an arrangement similar to that described in my first patent. A graduated temperature scale is also attached to the upper end of the tube, and serves to regulate the action of the machine to any required degree of temperature.

No. 3 is the third modification, which is represented in Figures 3 and 3*. It consists of a spring, A. This spring may be of any suitable length, and suspended from the end of a metal tube, *a*, attached by a suitable bracket, *b*, to the bed-plate or wall. This connection of the spring with the tube is susceptible of a movement for adjustment of the spring by means of a slide, *c*, and held in place by a clamp-screw, *d*; or in place of this arrangement the spring may have a small ferrule attached to its upper end, and have a small pivot proceeding from the wall-plate pass into the ferrule with a suitable clamp-screw. A temperature scale may be either marked on the tube or pivot, or it may be attached to the plate and suitably adjusted with the spring. At the lower end of the spring is a small hole for the reception of a pin, *f*, attached to a weight, F, which rests on a knife-edge, *g*. This weight may be attached by a cord, wire, or chain to the crank of a bell wire, and if the spring expands by the heat, so that it releases the weight, said weight falls and gives the alarm.

No. 4 is the fourth modification, which is represented in Figure 4, and may be arranged in the following manner: a metal wire, *a**, by preference, a German silver wire, of any suitable length, is used as the expansion piece. This wire is attached to the wall of a room; one end is made fast and the other end attached to the end of a lever, *b**, which turns or partly rotates on a pivot, *c**, fixed to the wall. This pivot connection will not be in the centre of the lever, but by preference is placed at a point near the end, where the wire attachment is made, thus dividing the lever into a long and short arm. At the extreme end of the long arm a weight, *d**, is suspended for the purpose of keeping the wire taut, and merely rests on its bottom on the top of the short arc of a second lever, $e^*$, likewise partly rotating on a pivot secured in the bed or wall. The handle of this weight is provided with a screw arrangement, by which means the weight may be arranged for any required degree of temperature, in connection with the elongation or contraction of the wire, which in this case takes the place of the spring, or the graduated scale may be fixed opposite the long arm of the first or second lever, so as to indicate the degree of heat. At the outer end of the long arm of this second lever is a hole perforated for the reception of the end of a pin, $g^*$, connected with a second weight, $h^*$, resting on a knife-edge, $i^*$, or other suitable support. This weight may be connected by wire, chain, or cords, to the crank-movement of a bell wire, and in its place a suitable spring may be used. When the lever, $b^*$, turns by the expansion of the wire, the weight, $d^*$, sinks down, and the second weight, $h^*$, or the spring substituted for the weight, being released, causes the alarm to sound.

No. 5 is the fifth arrangement, which is shown in Figures 5 and 5*, and may be thus described: a compound spring, A, is placed either vertically or horizontally, and regulated at one end, as described in either No. 1 or No. 3, by means of screws and springs; at the other end there is a small hole for the reception of the bent end of a lever, $a$, of suitable length. Near the opposite end of this lever is a pivot arrangement connecting it to the wall, on which the lever turns. A sliding-weight, $o$, is placed on the lever, between the bent end and the pivot. At the other end of the lever is a compensating-weight, $d^2$ stationary on the lever. The movable larger weight, $o$, is intended to be connected by a chain, string, or wire, with the crank-movement of a bell wire.

With the foregoing brief description of my improved modification of "Dion's Domestic Fire Alarm," I will now proceed to describe more particularly the mode in which each modification is worked, commencing with No. 1:

The instrument is secured to the wall of a room, in a vertical position, and the spring screwed to any degree of temperature marked on the scale; the falling lever, D, is placed in a vertical position, with the short pin projecting through the aperture in the upper end of the spring, and the pin of the falling-weight passing through the aperture in the upper end of the spring, and the pin of the falling-weight passing through the aperture in the end of the crooked lever, E, with the falling-weight properly attached to the bell-wire crank, as the temperature of the room increases or rises the upper end of the spring gradually travels out, until it detaches itself from the pin in the end of the falling lever, which being unsupported immediately falls upon the bent lever, which by the action communicated to it detaches itself from the pin in the falling-weight, which being thus left unsupported, also falls, and by means of the string, &c., rings the bell, or if the falling lever be of sufficient weight in falling, it may be connected by a strong wire or chain immediately to the bell-wire crank, and so ring the bell without the assistance of the bent lever and falling-weight. In No. 2 modification, the spring is screwed to the required degree of temperature, and the pin from the tilt-valve pressed through the aperture in the upper end of the compound spring; the marble or other weight is placed on the top of the tilt-valve, which is held in place by the pin and spring, as before mentioned. As the temperature of the room rises, the spring travels out and detaches itself from the pin, when the tilt-valve immediately opens and allows the marble to fall down the tube, coming in contact with a lever arranged in the mannor shown in "Dion's Domestic Fire Alarm," and so starts the bell. In No. 3 modification, the upper end of the spring is screwed to the required degree of temperature, and the lower end attached to the handle of the weight, which rests on its lower side on a knife-edge, and connected properly to the bell wire. On the increase of the temperature in the room, the compound spring increases in length and detaches itself from the pin in the weight, which then falls, and in doing so rings the bell. In No. 4 modification, the long metal wire, or German silver wire, is attached by one end to the wall, and by the other end to the short arm of the lever, the handle of the first weight placed so that it does not quite come in contact with the short arm of the second lever, the long arm of which is attached to the second weight by having its pin pass through the aperture in the lever. As the temperature increases, the short arm of the first lever gradually rises, and the long arm falls with a corresponding increased ratio, until the first weight comes in contact with the short arm of the second lever, which it presses down, raising in an increased ratio the long arm, which soon frees itself from the supporting-pin of the second weight, which, being unsupported on the knife-edge, falls over and rings the bell. In the fifth modification the compound spring is screwed to the required temperature, and the lever with its two weights properly balanced and adjusted and connected by its hooked end to the aperture in the end of the compound spring; the sliding ball or weight properly connected by a chain or cord to the crank. As the temperature of the room rises, the compound spring increases in length and frees itself from the hooked end of the lever, allowing its long arm to fall, and in doing so the sliding-weight also falls, moving along the lever to its lower end, and being connected to the bell crank by means of a chain or string, rings the bell.

What I claim as new, and desire to secure by Letters Patent, is—

The expansion-piece A, or $a^*$, and bed-plate or tube B, or other equivalents, as shown in the different modifications, in combination with the tilting-lever D, or its equivalent, and with the falling-weight F, or its equivalent, constructed and operating substantially as and for the purpose described.

C. DION.

Witnesses:

A. Bourbonnier,

C. G. B. Drummond.